Sept. 3, 1968 V. HILDEBRANDT 3,400,384

READ/WRITE CIRCUIT FOR DYNAMIC INFORMATION STORAGE UNIT

Filed Dec. 28, 1967

Inventor:
VOLKER HILDEBRANDT

BY Spencer & Kaye
ATTORNEYS.

United States Patent Office 3,400,384

Patented Sept. 3, 1968

3,400,384

READ/WRITE CIRCUIT FOR DYNAMIC INFORMATION STORAGE UNIT

Volker Hildebrandt, Constance, Germany, assignor to Telefunken Patentverwertungsgesellschaft m.b.H., Ulm, Danube, Germany Filed Dec. 28, 1967, Ser. No. 694,258
Claims priority, application Germany, Dec. 29, 1966, T 32,882
7 Claims. (Cl. 340—173)

ABSTRACT OF THE DISCLOSURE

A plurality of dynamic information storage positions are defined in a delay line storage loop by means of sequential timing pulses. Binary coded numbers with N bits in the code of each digit are stored in the delay line storage loop in accordance with an interspersed serial code in which each bit of each binary coded number is adjacent in the time sequence to the corresponding bit of a different binary coded number, whereby the consecutive bits of each binary coded number are separated from each other in the time sequence and are interspersed among the individual bits of other binary coded numbers. In the read/write circuit, the individual bits of each binary coded number are defined and located by means of timing signals generated by a fixed counter and a variable counter. The fixed counter counts from 1 to $(N'-P)$, where N' is $1/N$ of the number of bits in all of the binary coded numbers and P is the number of binary coded numbers in the interspersed serial code. The variable counter counts to 0, P or 2P, and its count is added to the count of the fixed counter, which is restarted by the output of the variable counter. A logic circuit is coupled to the fixed counter to produce P sequential timing signals in response to P consecutive steps in the counting cycle thereof, and a control circuit selects one of the sequential timing signals and applies it to the input and/or output of the delay line storage loop for writing the corresponding binary coded number into the pulse delay line or for reading out the corresponding binary coded number from the pulse delay line.

*Background of the invention*

This invention relates to calculators which utilize dynamic information storage units such as disclosed, for example, in applicant's copending patent application Ser. No. 621,047, which was filed on Mar. 6, 1967, for an "Electronic Calculator Utilizing Delay Line Storage and Interspersed Serial Code." As described in this copending application, a dynamic information storage unit comprises, for example, a pulse delay line, input means for applying a train of input pulses representing binary bits to one end of the pulse delay line, output means for receiving the train of pulses at the other end of the pulse delay line, and feedback means coupled between the input and output means for continuously recirculating the train of pulses through the pulse delay line.

A plurality of dynamic storage registers are defined in the pulse delay line storage loop by means of timing signals. A pulse train representing binary coded numbers within the different dynamic storage registers is applied to the dynamic storage loop in an "interspersed serial code" wherein, if E is the transit time of the delay line, M is the bit capacity of the delay line, and N is the number of bits in the code of one digit, the time dispersion between consecutive bit positions within the code equals $E/N$ and the time dispersion between digit positions of different registers equals $E/M$. In order to read out the contents of register positions from the storage unit, N equidistant selection pulses are generated in the timing pattern of the bit pulses during each cycle. The time interval between an Nth selection pulse and the following selection pulse can be preset within the bit timing pattern for varying durations by the control mechanism of the calculator circuit. Two counters are provided to generate the selection pulses, the first counter always counting up to a fixed maximum counting position and then starting the second counter, whose maximum counting position can be preset to a different total number of steps by the control mechanism. The first counter is then started again by the output signal of the second counter.

In the above-mentioned dynamic storage unit, the contents of the positions of four registers form the contents of the dynamic storage loop. A selection pulse is generated whenever the above-mentioned second counter reaches its maximum counting position, and this counter (which counts in the bit timing pattern of the storage unit, as does the above-mentioned first counter) can be preset to the maximum counting position of 0, 1, 2 . . . 8, so that when the contents of a register position have been read out, the same contents can be read out once more, or the contents of the next lower position or those of the next higher position of the same register, or the contents of those positions in the other three registers which correspond to the position first mentioned above can be read out. The counter positions 1, 2, 3 or 5, 6, 7 serve to effect transition into another register, depending on whether the bits of this other register, precede the bits of the previously read register by 1, 2 or 3 bit pulse intervals or whether they follow them by 1, 2 or 3 bit pulse intervals. This organization has the result that "a record" must be kept in the control mechanism of the sequence of changes in the second counter in order to determine which register is being worked at the moment, because the register into which one moves due to one of the counter settings 1, 2, 3 or 5, 6, 7 depends on the register in which one was previously working.

*Summary of the invention*

An object of the present invention is to simplify the above-mentioned arrangement. The present invention eliminates the above-noted necessity of recording sequences and allows the individual register to be addressed directly in the sense that at any stage of the working process, in order to reach a register circulating in the storage loop, it is only necessary to activate a selection signal which is permanently associated with this register. According to the present invention, when P registers are defined in the storage unit, the second counter can be preset by the control mechanism for the purpose of register position selection to the maximum count of only 0, P or 2P. Logic circuits are coupled to the first counter for producing P sequential timing signals in response to the first P steps in the counting cycle thereof. Selection means are provided in the control mechanism for selecting a predetermined one of the P sequential timing signals and for applying it to the input and/or output of the storage loop for writing information into the storage loop or reading information out of the storage loop.

*Description of the preferred embodiment*

Figure 1:
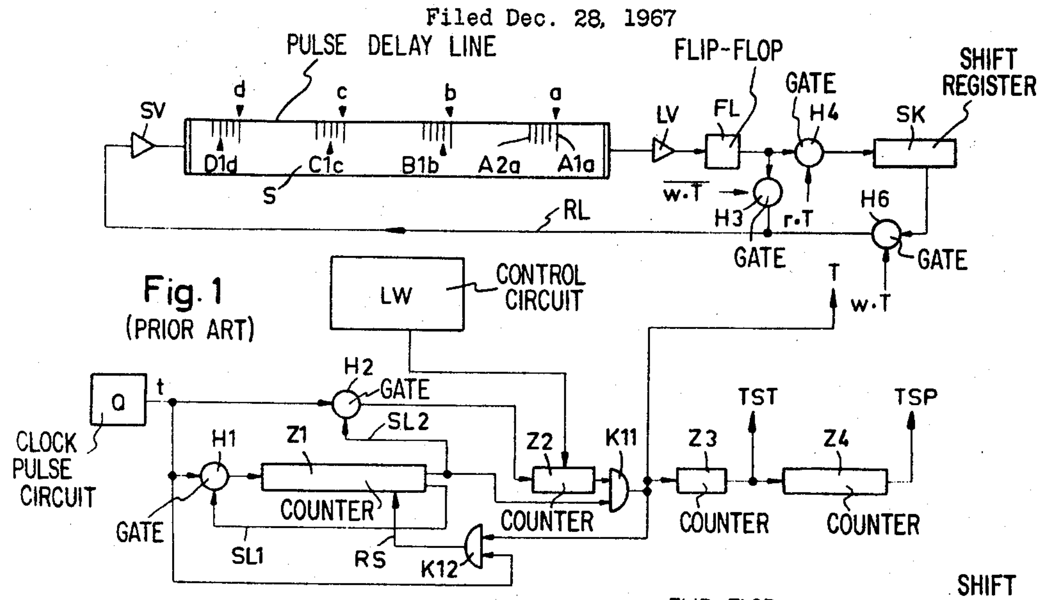
Fig. 1 (PRIOR ART)
FIGURE 1 is a block diagram of a prior art dynamic information storage circuit.

FIGURE 1 shows a prior art dynamic information storage circuit such as disclosed in the above-noted copending application. Referring to FIGURE 1, a delay line S is utilized for dynamically storing a train of pulses which represent binary coded numbers. Delay line S preferably comprises a glass rod of approximately 15 cm. in length, into which shear pulses are introduced on the left-hand side by means of a piezoelectric transducer. These pulses propagate through the length of the rod and are converted by another piezoelectric transducer back into electrical pulses at the right end of the glass rod. SV is a writing amplifier for the input pulses, and LV is a reading amplifier which amplifies the output pulses. RL is a feedback line to recirculate pulses through glass rod S to form a dynamic binary storage loop. In this particular embodiment, a pulse traversing delay line S has the binary value "0." The lack of a pulse signifies L. When, therefore, no information other than "0" is stored, an uninterrupted succession of pulses traverses rod S.

Binary information is entered into this dynamic storage loop through a shift register SK and input gate H6, whose operation is discussed in detail in the above-noted copending application. On the output side of the dynamic storage loop, the binary information is passed from output amplifier LV through a pulse-forming flip-flop circuit FL, and from flip-flop FL either through gate circuit H3 or H4. Information passing through gate circuit H3 is recirculated through the delay line via feedback conductor RL, and information passing through gate circuit H4 is applied ot shift register SK for numerical computations as described in more detail in the above-noted copending application. Since this invention is concerned only with the writing in or reading out of the binary information, the arithmetic portions of the circuit will not be discussed in detail in this application.

The delay line S is used to store four binary coded decimal numbers each having 16 digits. The numbers are stored in four dynamic register A, B, C, and D. The bits of a tetrad are *a, b, c, d*. When, for example, the first bit of the first position of register A is denoted as A1*a*, and the second bit in the 16th position of register D is D16*b*, the sequence of bits in delay line S for the above-noted interspersed serial code is A1*a*, B1*a*, C1*a*, D1*a*; A2*a*, B2*a*, C2*a*, D2*a*; . . . A16*a*, B16*a*, C16*a*, D16*a*, A1*b*, B1*b*, C1*b*, D1*b*; . . . D16*b*; A1*c* . . . D16*c*; A1*d* . . . D16*d*; A1*a* . . . . The delay line S has a capacity of $$4 \times 4 \times 16 = 256 \text{ bits}$$

The momentary position of bits *a, b, c, d* of a tetrad is marked on delay line S is the drawing. In cyclic circulation, these bits move at intervals of 64*t*, where *t* is the time interval defining one bit. The bits marked in the drawing on the right-hand side of each group of bits represent the four tetrad bits of the first position of register A, i.e., the bits A1*a*, A1*b*, A1*c*, A1*d*. In the immediately following bit positions are then bits B1*a*, B1*b*, B1*c* and B1*d*, then follow bits C1*a*, . . . C1*d*, then bits D1*a*, . . . D1*d*. And again, at an interval of 4*t* from the marked bits, follow the tetrad bits of the second position of register A, i.e., the bits A2*a*, A2*b*, A2*c*, A2*d*, then the bits B2*a* . . . B2*d*, and so on.

Therefore, at intervals of 64*t*, three further pulses must follow an extraction pulse *r*T which is to extract a tetrad bit (*a*) via gate H4 to extract the tetrad bits *b, c, d* (the conjunctive condition *r* indicates that a selection pulse T is to become effective through gate H4). If another extraction pulse *r*T again follows at 64*t*, it will again extract the above-mentioned tetrad bit (*a*). If, however, the interval following the extraction of tetrad bit (*d*) is extended once to be longer than the normal value of 64*t* (or is shortened), another register position or another register is thus reached. If, for example, after extraction of the bit A1*d* marked in the drawing, the interval to the next extraction pulse *r*T is extended by 4*t* to 68*t*, bit A2*a* is extracted, i.e., one has moved into the next digital posiiton of register A whose tetrad will be obtained if three further intervals of 64*t* follow. If, however, after extraction of A1*d*, the interval would be extended by 1*t* to 65*t*, one would obtain bit B1*a*, etc. If, for example, after extraction of D1*d*, the normal interval is shortened by 1*t*, i.e., the next extraction pulse follows after 63*t*, one obtains bit C1*a*, i.e., one has moved from register D to register C. The same applies for storage via gate H6 with clock pulses *w*T.

To generate clock pulses T for writing in or reading out of bits in the calculator according to the above-described principles the following circuit elements are provided: Referring to FIGURE 1, the output of a crystal-controlled clock pulse generator Q delivers bit timing pulses *t* which travel through a gate H1 to a binary counter Z1 which starts counting at 1 and counts to (N′–P), where N′ is 1/*N* the number of bits in all of the binary coded numbers and P is the number of binary coded numbers in the interspersed serial code, i.e., the number of registers. In this particular example, the maximum count of counter Z1 is equal to (64–4) or 60. As long as this maximum counter position has not been reached, the counter Z1 keeps gate H1 open via a control line SL1. When counter Z1 reaches 60, gate H1 is closed by control circuit SL1 and gate H2 is opened instead by control circuit SL2. Clock pulses *t* now travel through H2 to a four-stage binary counter Z2. This counter Z2 can be preset so that the number of upward-counting steps up to its maximum counting position, after which a clock pulse T is formed through an AND-gate K11, can be set by the control mechanism LW for the values 0 to 8, inclusive. If the number of these steps equals 0, i.e., if counter Z2 has been preset to its maximum counting position, the AND-gate K11 is enabled when the counter Z1 reaches 60 and the clock pulse T is thus directly generated. In the other cases, the AND-gate K11 is enabled by counter Z1 and the clock pulse T is generated through AND-gate K11 when the counter Z2 reaches its maximum counting position. This happens, for example, in four upward-counting steps of Z2 with a delay of 4*t*, in eight upward-counting steps with a delay of 8*t*. The clock pulses T determine the intervals at which bits are read out from the dynamic storage loop through gate H4 or are written thereinto through gate H6. When bits are written in, gate H3 is simultaneously closed by a negating pulse *w*T̄.

Each output pulse T is counter Z2 further acts as an enabling potential on AND-gate K12 at whose output there is a reset line RS for counter Z1. Clock pulse *t* is applied to the second input of K12 so that the clock pulse *t* which follows when K11 is enabled resets counter Z1 to "1" through K12, thus closing K11 and H2 again, but opening H1; thereupon counter Z1 again begins to count upwardly.

Furthermore, each clock pulse T enters the upward-counting input of a further binary counter Z3 which normally counts to 4 and then emits a clock pulse TST. This clock pulse (position timing) indicates the time intervals after which the four bits *a, b, c, d* of a tetrad are read out or written in, respectively.

Each output pulse TST of counter Z3 also enters the upward-counting input of a four-stage binary counter Z4 which always counts to 16 and then emits a clock pulse TSP. This clock pulse indicates the point at which the 16 positions of a register were counted through, in other words, that the 4 x 16 bit storage positions of a register were read out or written in, respectively.

In the above-described arrangement, therefore, a selection pulse T is emitted whenever counter Z2 has reached its maximum counting position, at the same time counter Z1 is actuated again and a new counting cycle follows. The length of each counting cycle depends on the presetting of counter Z2. In this manner, the transition from one register into another is accomplished. The register that one moves into due to extending or shortening the time interval after extraction of a bit (*d*) to the next reading pulse T, depends on the register that one was operating in before the extension or shortening of the time interval.

It can be seen, then, that the above-described previously proposed information storage unit required some means for recording the sequence of changes in the counter Z2 in order to determine which register was being written into or read out of at any given time, since the register that one moves into due to a change in the setting of counter Z2 depends upon the register which was active before the change. This dependence upon previous settings is, however, eliminated with the improved read/write circuit of this invention, one embodiment of which is shown in FIGURE 2.

Figure 2:
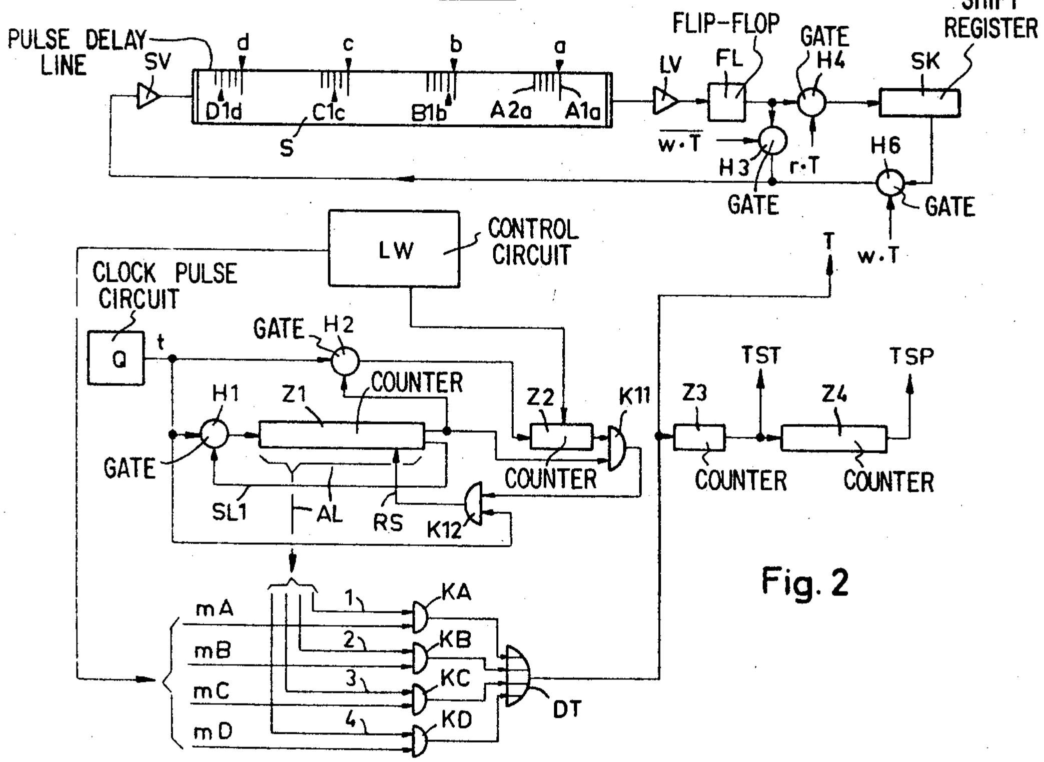
FIGURE 2 is a block diagram of the read-out circuit of this invention as applied to the information storage circuit of FIGURE 1.

In the circuit arrangement according to FIGURE 2, the circuit elements which are identical to those of FIGURE 1 are marked with the same reference numerals. The circuits of FIGURES 1 and 2 operate in the same manner except for the following modifications:

In the circuit of FIGURE 2, the counter Z2, which during extracting of a tetrad is set for the counting position 4, can now be set by the control mechanism LW, after extraction of a bit *d*, only to the maximum counting positions 0, P, or 2P, where P is the number of registers. In this particular example, P equals 4, and the counter Z2 can therefore only be set to the maximum counting positions of 0, 4, or 8. The pulse emitted by the counter Z2 when it reaches its end position now only restarts the counter Z1 so that it can again run through its 60 counting steps. An interrogation logic circuit AL consisting of AND-gates is connected to counter Z1 in a known manner for interrogating the first four immediately consecutive counter positions of counter Z1. The interrogation logic circuit AL can interrogate the counter position 1, thus activating the output line 1, the counter position 2, thus activating line 2, the counter position 3, thus activating line 3, and the counter position 4, thus activating line 4. Each one of these lines is applied to the input of an AND-gate *k*A, *k*B, *k*C, or *k*D, respectively. The second input of the AND-gate *k*A can be activated by the control mechanism LW via a line *m*A; the second input of AND-gate *k*B can be activated via line *m*B, the second input of *k*C can be activated via *m*C and the second input of *k*D can be activated via *m*D. The outputs of these four AND-gates are connected to an OR-circuit DT. At the output of the OR-gate DT there now appear the selection pulses T which in the above-described manner serve as reading pulses or as writing pulses and which are also, as described above, applied to counter Z3. Counters Z3 and Z4 operate in the same manner as described above in connection with FIGURE 1.

The adjustment of counter Z2 to a counting position 0 or 8 in the circuit of FIGURE 2 again serves to move into the next lower or next higher position, respectively, of the same register after a bit (*d*) of a register position has been extracted. The position of counter Z4 always indicates which register position is being read out or written in, respectively, at the moment. Register A or B or C or D, whichever is the one whose position is to be indicated, is determined by the control mechanism LW activating one of the lines *m*A, *m*B, *m*C, or *m*D. Assume, for example, that bit A1*d* had been read out. If counter Z2 then remains on position 4 and line *m*A is energized by the control mechanism, a total of 64 counting steps occur before the counter Z1 goes into position 1 again. The AND-gate *k*A will then emit a selection pulse T. The *a*-bit of the same position, i.e., A1*a*, is thus read in. When, however, for example, line *m*C is energized, 66 steps will occur before counter Z1 reaches position 3 and bit C1*a* will be read. Then a total of 64 steps follow until position 3 of counter Z1 is reached again. Thus, bit C1*b* is read, then in the same manner bit C1*c* is read, and then bit C1*d*. If after reading of this *d*-bit, counter Z2 is nonrepeatingly set to the counting position 8, bit C2*a* will subsequently be extracted or written in, and so on. It is now sufficient for the programming of the register controls in a certain phase of the operational process to indicate the identification of just the desired register, and the control mechanism LW emits a simple identifying signal by activating line *m*A, *m*B, *m*C, or *m*D.

It should be noted, however, that the interrogation circuit AL must not necessarily interrogate the first four consecutive positions of counter Z1. It can easily be seen that the consecutive counting positions of counter Z1 which are interrogated can be located in other positions within the counting range of the counter if desired.

It will be understood that the above description of the present invention is susceptible to various modifications, changes, and adaptations, and the same are intended to be comprehended within the meaning and range of equivalents of the appended claims.

I claim:

1. A dynamic information storage circuit comprising, in combination:

(a) a pulse storage loop for receiving and continuously recirculating a train of pulses representing a plurality of binary numbers;

(b) a clock pulse circuit coupled to said pulse storage loop for generating timing signals defining bit time intervals in said train of pulses;

(c) fixed counter means coupled to the output of said clock pulse circuit for counting to (N′−P), where N′ is the number of bits in all of said binary numbers divided by a number N of bits to be written into or read out of the storage loop during one circulation and P is the number of binary numbers than can be represented in said train of pulses, said fixed counter means being operable to produce one output signal in response to (N′−P) input signals;

(d) variable counter means coupled to the output of said clock pulse circuit and to the output of said fixed counter means for counting to a variable integer K which can be preset to the values 0, P, or 2P, said variable counter means being operable to produce one output signal in response to K input signals;

(e) gate means coupled between the output of said fixed counter means and the input of said variable counter means for coupling the input of said variable counter means to the output of said clock pulse means in response to an output signal from said fixed counter means for adding the count of said variable counter means to the count of said fixed counter means;

(f) means coupled between the output of said variable counter means and said fixed counter means for restarting said fixed counter means in response to an output signal from said variable counter means;

(g) logic means coupled to said fixed counter means for producing P sequential timing signals in response to P consecuvtive steps in the counting cycle thereof, where P is the number of binary numbers that can be represented in said train of pulses; and (h) means for selecting a predetermined one of said P sequential timing signals and for applying the selected timing signal to said pulse storage loop for writing the corresponding binary number into the pulse storage loop or for reading the corresponding binary number out of the pulse storage loop.

2. A dynamic information storage circuit as defined in claim 1 and further comprising means coupled to said pulse storage loop for defining an interspersed serial code in which the individual bits of a plurality of binary numbers are interspersed with each other in said train of pulses, each bit of each binary number being adjacent in the pulse train sequence to the corresponding bit of a different binary number, whereby the consecutive bits of each binary number are separated from each other in the pulse train sequence and are interspersed among the individual bits of the other binary numbers.

3. A dynamic information storage circuit as defined in claim 2 wherein said pulse storage loop comprises a pulse delay line, input means for applying a train of pulses representing binary numbers to one end of said pulse delay line, output means for receiving said train of pulses at the other end of said pulse delay line, and feedback means coupled between said input and output means for continuously recirculating said train of pulses through said delay line.

4. A dynamic information storage circuit as defined in claim 3, and further comprising second gate means coupled between the output of said clock pulse circuit and the input of said fixed counter means, the output of said fixed counter means being coupled to said second gate means for closing said second gate means in response to an output signal from said fixed counter means, and said restarting means being coupled to said second gate means for opening said second gate means in response to an output signal from said restarting means.

5. A dynamic information storage circuit as defined in claim 4 in which said train of pulses represents P binary numbers each of which contains binary-coded-decimal digits, each of said binary-coded-decimal digits being represented by N binary bits.

6. A dynamic information storage circuit as defined in claim 5 wherein said means for selecting a predetermined one of said P sequential timing signals comprises a plurality of P AND-circuits, each of said AND-circuits having two inputs and an output, one input of each AND-circuit being coupled to a corresponding one of said P sequential timing signals, the output of each AND-circuit being coupled to the input and/or output means of said pulse delay line, the other input of each of said AND-circuits being coupled to a selection conductor, and means for energizing a predetermined one of said selection conductors to apply the corresponding sequential timing signal to said pulse storage loop.

7. A dynamic information storage circuit as defined in claim 4 wherein said restarting means comprises two AND-circuits each having two inputs and an output, one input of one of said AND-circuits being coupled to the output of said fixed counter, the other input thereof being coupled to the output of said variable counter, and the output thereof being coupled to one input of the other AND-circuit, the other input of said other AND-circuit being coupled to the output of said clock pulse circuit, and the output of said other AND-circuit being coupled to said fixed counter for restarting the counter.

References Cited

UNITED STATES PATENTS 2,783,455 2/1957 Hindall ............. 333—30

TERRELL W. FEARS, *Primary Examiner.*